United States Patent [19]

Tyree, Jr. et al.

[11] Patent Number: 4,739,623

[45] Date of Patent: Apr. 26, 1988

[54] LIQUID CRYOGEN FREEZER AND METHOD OF OPERATING SAME

[75] Inventors: Lewis Tyree, Jr., Oak Brook; Martin M. Reynolds, Aurora; Gary D. Lang, Naperville, all of Ill.

[73] Assignee: Liquid Carbonic Corporation, Chicago, Ill.

[21] Appl. No.: 61,676

[22] Filed: Jun. 11, 1987

[51] Int. Cl.[4] .............................................. F25D 13/06
[52] U.S. Cl. ............................................ 62/63; 62/381
[58] Field of Search .................................... 62/63, 381

[56] References Cited

U.S. PATENT DOCUMENTS

| | | | |
|---|---|---|---|
| 3,255,608 | 6/1964 | Macintosh | 62/374 |
| 3,412,476 | 11/1968 | Astrom | 62/381 |
| 3,464,229 | 9/1969 | Riley | 62/381 |
| 3,733,848 | 5/1973 | Duron et al. | 62/381 |
| 4,078,394 | 3/1978 | Chamberlain et al. | 62/203 |
| 4,103,507 | 8/1978 | Benois | 62/63 |
| 4,103,768 | 8/1978 | Perrson | 62/381 |
| 4,276,753 | 7/1981 | Sandberg et al. | 62/186 |
| 4,324,110 | 4/1982 | Lovette, Jr. et al. | 62/381 |
| 4,356,707 | 11/1982 | Tyree, Jr. et al. | 62/381 |
| 4,403,479 | 9/1983 | Rasovich | 62/63 |
| 4,480,535 | 11/1984 | Jaxmar et al. | 62/381 |

*Primary Examiner*—Ronald C. Capossela
*Attorney, Agent, or Firm*—Fitch, Even, Tabin & Flannery

[57] ABSTRACT

A cabinet freezer efficiently utilizes a liquid cryogen refrigerant in conjunction with a spiral conveyor which conveys a product load through a temperature gradient within the freezer. The freezer has a lower inlet and an upper outlet for the conveyor and food load thereon. The escape of cryogen vapors created in the freezer from the liquid cryogen is controlled such that at least about 80% of the vapors exit through the upper outlet which is at the warmest zone established as a part of the temperature gradient in the freezer.

13 Claims, 4 Drawing Sheets

LIQUID CRYOGEN FREEZER AND METHOD OF OPERATING SAME

This invention relates to cryogenic cooling apparatuses, and more particularly to apparatuses which use liquid cryogen, such as nitrogen, to cool a load within a defined chamber or compartment by establishing a temperature gradient therein and methods for carrying out such cooling.

BACKGROUND OF THE INVENTION

Various known apparatuses especially spiral freezers which use a liquid cryogen, such as carbon dioxide or nitrogen, are essentially operated as "isothermal" freezers, i.e. operating at one low temperature throughout the cooling or freezing chamber. As a result, the exiting cryogen gas is close to the cold temperature of the device, and some of the cooling capabilities of the gas and efficiency are lost. The cooling apparatus described in U.S. Pat. No. 4,356,707 is an example of an isothermal freezer using carbon dioxide.

In respect to most food products, a liquid cryogen coolant, such as nitrogen, has the ability to provide cooling at a faster rate than food products can thermally accept. Most food products, for example, accept freezing rapidly at the beginning of the freezing process, and thereafter the ability of the food to thermally accept freezing slows. This can lead to some inefficiencies. Moreover, some loss of cryogen may occur through the entrance of the cooling device as products, such as food products, enter it.

When cooling apparatuses use an endless conveyor belt having a spiral or helical section to convey food into and through a refrigeration zone, the belt, which generally is porous, generally collapses along its inner edge as it begins to turn from its straight entrance section into its spiral or helical conformation as it moves through the cooling apparatus. Because of this collapsing, food or other frangible items carried by the conveyor belt can be harmed as a result of a pinching action exerted by the collapsing belt on food that may be frozen thereto when the belt and the food turns into the helical section. If food should be frozen to the upper surface of the belt, such a pinching action of the belt section which collapses may often result in tearing and damage to the food surface. Further, cooling apparatuses which use a cryogen and spiral conveyor belts have had the proclivity to allow the cryogen gas to exhaust through the intake or discharge opening for the belt. Generally the intake opening is at a lower part of the apparatus; and the discharge opening for the belt usually is at the upper portion of the apparatus, the belt taking a load vertically up through the cooling chamber for cooling. In such cooling apparatuses, such flow of the cold vapor from a cryogen exiting the inlet opening is not controlled so as to exact maximum BTUs for cooling.

It is an object of this invention to provide a cabinet cooler or freezer which uses a liquid cryogen for refrigeration and extracts maximum benefit from such liquid cryogen to rapidly and efficiently lower the temperature of a product load.

It is another object of this invention to provide a cabinet freezer which uses a liquid cryogen and which freezer includes means for contacting a product load with the liquid cryogen as the load enters the freezer to initially withdraw heat from the load, and to freeze the surface of the products so as to stop evaporative dehydration, thus minimizing shrink.

Another object of the invention is to provide a liquid cryogen cooler or freezer with an exhaust which generally provides circulation of vapor from the liquid cryogen such that a temperature gradient is created within the freezer with the exhaust exiting at relatively warm temperatures.

Still another object of the invention is to provide a freezer which controls cryogen vapor exiting from an inlet to the freezer so that at least about 80% of the cryogen vapor of the total vapor is circulated through a temperature gradient within the freezer and exits from the outlet of the freezer at relatively warm temperatures.

Yet another object of the invention is to provide a method for providing cooling to a product load in a freezer such that the cooling of the freezer matches or correlates with the ability of the product load to accept freezing.

These and other objects of the invention should be apparent from the following detailed description for carrying out the invention when read in conjunction with the accompanying drawings.

SUMMARY OF THE INVENTION

The invention provides a freezer or cooler which utilizes a liquid cryogen, in conjunction with or without mechanical refrigeration, to rapidly and efficiently lower the temperature of a product load being moved through the freezer on a conveyor having a path in the freezer a major portion of which is helical. As such, the freezer includes an inlet; a means for contacting the product load with the liquid cryogen as it enters the freezer through the inlet to withdraw a substantial amount of heat from the surface of the product load on the belt; means for circulating the cryogen vapor through the apparatus to create a temperature gradient within the freezer such that relatively warm vapor exits an outlet of the freezer; and means for controlling the exit of cold vapor from the inlet of the freezer such that at least about 80% of the vapor created from the liquid cryogen in the freezer exits through the outlet of the freezer.

The invention is particularly adapted for efficiently freezing frozen food, and when the freezer is moving a product load of food along a path into an inlet at the lower portion of the freezer, the food is contacted with liquid cryogen, such as nitrogen, prior to entering a turn on the conveyor, the food surface freezing and acquiring sufficient rigidity that it will not be harmed by the turning conveyor belt. One or more fans or blowers blow away from the inlet and their motors are electrically coupled with a temperature sensor in an exhaust duct which draws air from a region adjacent the inlet to the freezer. Such a blower provides control of the exit of cold cryogen vapor from the lower inlet region of the freezer by directing cryogen vapor inwardly into the freezer, away from the inlet. If the temperature of the discharge stream in the exhaust conduit rises, the speed of the blower motor is decreased; if the temperature of the discharge stream drops below a preset temperature, the speed of the blower motor is increased so as to suck more cold cryogen vapor from the region of the inlet. An exhaust blower, which may be mounted near the roof of the building, sucks a stream of the ambient air which would otherwise enter the freezer along with the food together with some cryogen vapor exiting from the inlet with this mixture being pulled through a discharge duct wherein the temperature sensor is located. Generally a positive pressure of cryogen gas is maintained in the freezer to keep air and humidity from entering the freezer which would result in undesired warming and frost.

The means for contacting the food load with liquid cryogen includes spray nozzles having fixed or variable orifices. These spray nozzles are located in the lower portion of the freezer and generally are not located above the lower quarter of the freezer. Many of the nozzles may be disposed between flights of the helical conveyor and spray liquid cryogen downwardly onto the food load. The contacting means also may include a pan at the bottom of the freezer which is adjacent and below the spray nozzles. The pan collects sprayed liquid cryogen that does not evaporate and provides a reservoir of liquid cryogen through which the food load optionally may be conveyed for freezing. The contacting means also may include a means for detecting the level of liquid cryogen within the pan for adjusting the flow of cryogenic liquid through the spray nozzles relative to the level detected in the pan. The liquid cryogen lines and the pan may be slightly insulated, so as to prevent unnecessary warming.

The freezer also includes a means for the horizontal circulation of vapor from the liquid cryogen through the upper regions of the freezer cabinet above the spray nozzles. In a freezer using liquid nitrogen, the action of these fans coupled with the natural tendency of the warmer vapor to rise creates a temperature gradient of at least about 150° F. between the vapor adjacent the bottom of the freezer and the vapor adjacent the top of the freezer.

DESCRIPTION OF THE PREFERRED EMBODIMENTS OF THE INVENTION

Illustrated in FIGS. 1 through 6 is a cabinet freezer 2 which includes a large insulated cabinet 4 having four vertical insulated walls 6 for maintaining a low-temperature environment therewithin. Several doors 8 and a window 9 provide physical and visual access, respectively, to the interior of the cabinet wherein an endless porous conveyor 10 is located.

Figure 1:
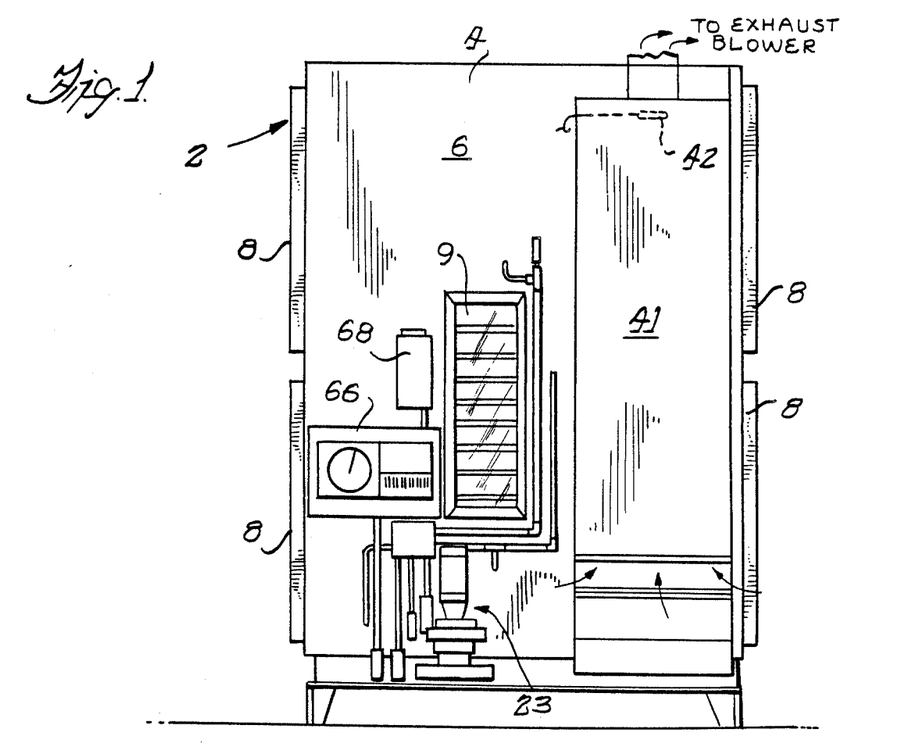
FIG. 1 is a front view of a freezing apparatus according to the invention utilizing liquid cryogenic refrigeration and a spiral endless conveyor.
Figure 2:
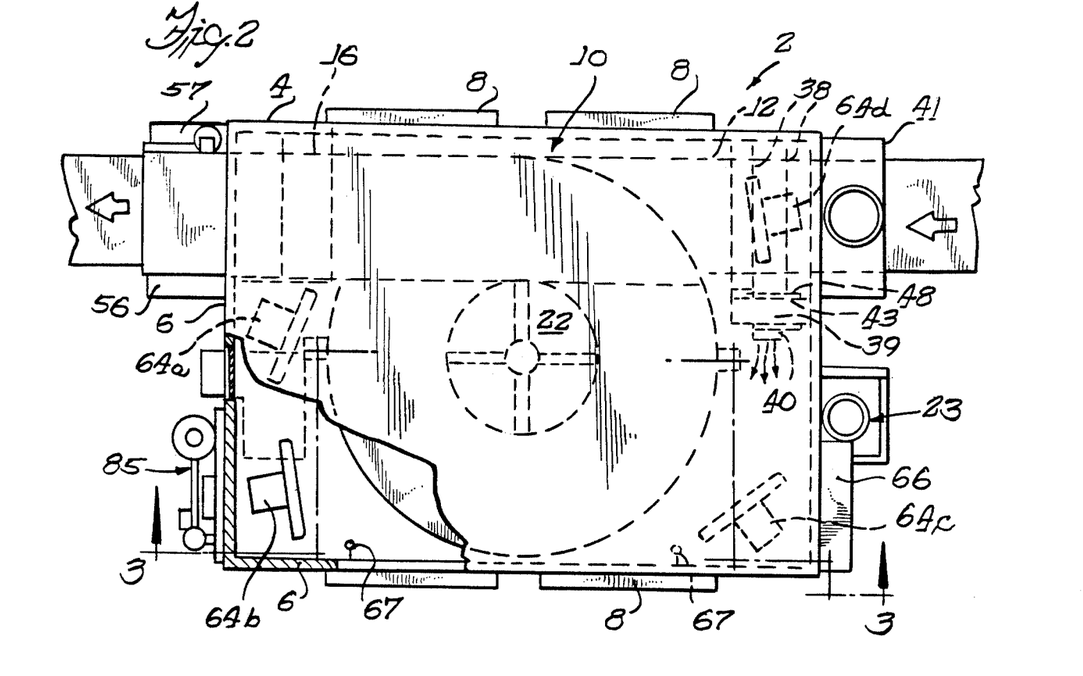
FIG. 2 is plan view of the freezing apparatus of FIG. 1 with portions broken away.
Figure 3:
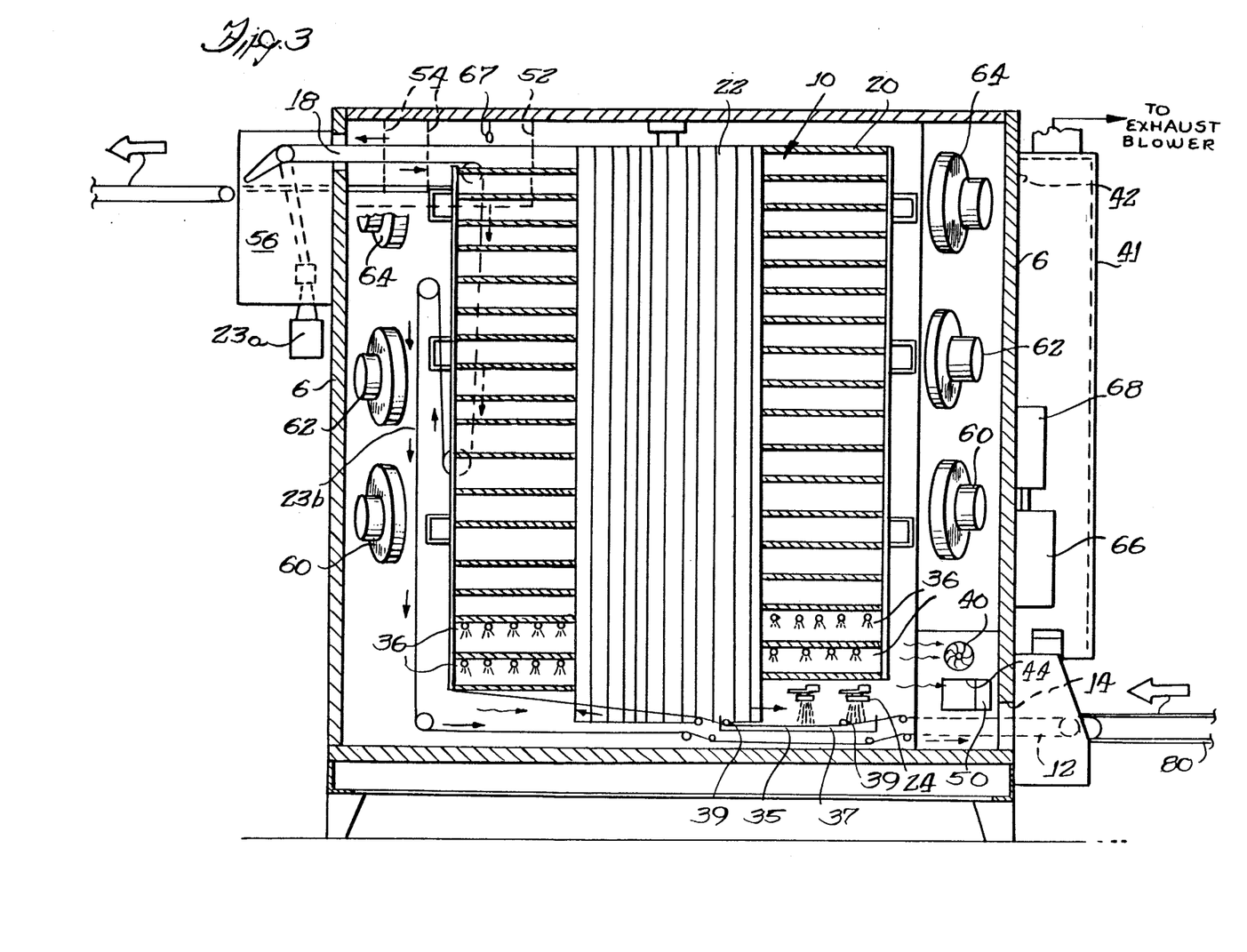
FIG. 3 is a vertical section view taken along line 3—3 of FIG. 2.

Referring to FIG. 3, the conveyor 10 is of the type illustrated in U.S. Pat. No. 4,078,655, issued Mar. 14, 1978, the disclosure of which is incorporated herein by reference. The conveyor 10 includes an endless belt preferably made of stainless steel which is arranged to have a short straight entrance section 12 disposed near the bottom of the cabinet that preferably protrudes through a lower entrance opening 14 in the insulated wall of the cabinet and a short straight exit section 16 that similarly preferably extends just through an upper exit opening 18. The entrance 14 and exit 18 are in line with each other and are at corners of opposite walls of the cabinet. In between the straight entrance and exit sections, the main helical section 20 of the endless belt is arranged to travel along a spiral or helical path about a central cage-type driving drum 22 in a plurality of flights or tiers. Although the path is preferably circular in plan view (FIGS. 2 and 4), it might also be oval or the like, in which case a modified drive arrangement would be employed. A main motor 23 drives the drum through a gear arrangement and preferably also drives a sprocket drive which meshes with the belt. A small tensioning motor 23a is located near the exit and suitably provides low tension in the belt sufficient to frictionally engage the central drum 22 which provides the primary motive power for the conveyor all most of its length, all as taught in the just-mentioned U.S. patent. A belt take-up arrangement 23b can be inside the insulated cabinet as shown, or alternately outside in a separate, small insulated enclosure.

A plurality of spray nozzles 24 are disposed linearly above the straight entrance section of the conveyor belt 12 for spraying liquid nitrogen downwardly onto the conveyor belt and the food load on the belt. These nozzles are disposed along liquid cryogen lines 24(a), 24(b) and 24(c) which supply liquid cryogen to the nozzles from a source (not shown) and which lines are generally normal to the path of the straight entrance section of the conveyor. Each line is adjacent and parallel to the other whereby food on the belt is exposed to sprays of liquid nitrogen in line seriatim.

Figure 6:
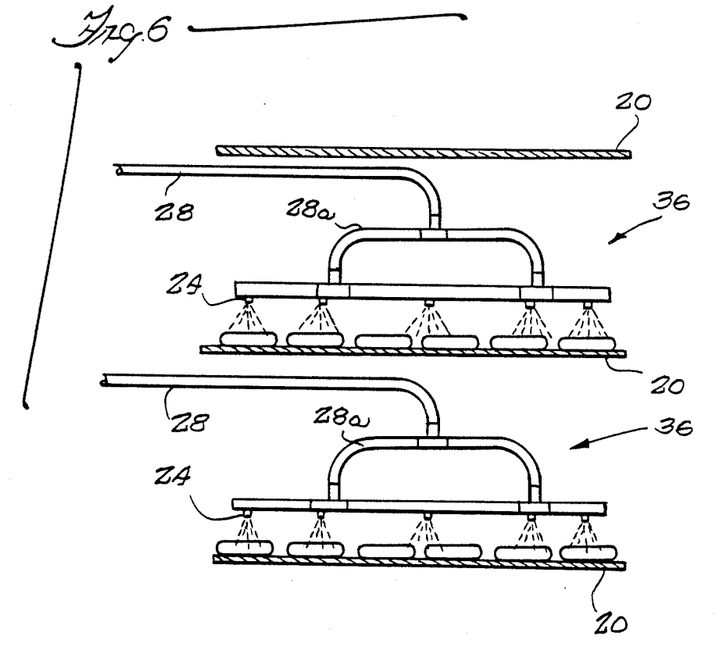
FIG. 6 is an enlarged fragmentary side view of a section of the conveyor belt of the freezer taken generally along lines 6—6 of FIG. 4.

Additional liquid cryogen lines connect to 26, 28, 30 and 32 and feed liquid cryogen from the source to a plurality of headers 26a, 28a, 30a and 32a which extend radially from drum 22, preferably above two adjacent flights of the belt as seen in FIGS. 3 and 6. Spray nozzles 24 depend from and are linearly spaced along these headers, with each header carrying multiple nozzles. Cryogen lines 26 to 32 are located between flights 34 of the main helical section of the conveyor belt and the spray nozzles on these lines are adapted to spray liquid nitrogen downwardly onto the food load on the belt. At the vertical level of the spray nozzles, the flights of the conveyor are vertically spaced as at 36 to accommodate the lines 26 through 32 and nozzles extending therefrom. These lines are positioned at various points generally adjacent the circumference of drum 22 with line 26 being generally adjacent cryogen line 24(c) but a tier above it and with cryogen lines 28 to 32 then being positioned about every 90° around the drum. The cryogen lines which spray the food load with liquid cryogen generally define a first lower cooling zone within the freezer where the food load is exposed to direct contact with liquid cryogen.

Within this first zone, a pan 35 is positioned on the floor of the freezer adjacent the entrance 14 of the freezer below the straight section of the conveyor belt and below the spray nozzles disposed along cryogen lines 24(a), 24(b) and 24(c). The pan collects liquid nitrogen being sprayed from above which does not immediately vaporize and serves as a shallow reservoir for liquid nitrogen from which evaporation then takes place. The conveyor belt and undersurfaces of the food load on the belt may be chilled by diverting the belt down into the pan as at 37, using suitable idler rollers shown schematically in FIG. 3 as 39. The belt then emerges from the pan and proceeds into its main helical section 20 in the freezer. The diversion of the belt into the pan freezes the lower portions of the food load on the belt while the upper portions are being subjected to the sprays of liquid nitrogen from above. A level detector 35a (FIG. 5) is provided in the pan for adjusting the flow of spray of liquid cryogen to achieve the desired level of liquid cryogen in the pan 35. Alternatively, instead of running the belt through the liquid cryogen in the pan, a lower spray system can be provided to spray upward through the porous belt against the undersurface of the food articles.

The outflow of cold nitrogen vapor at the bottom of the freezer is retarded by a series of baffles 38 which create separate chambers just interior of the entrance to serve as a labyrinth-type seal which reduces convection currents in the immediate region interior of the entrance. One or more blowers 40 are mounted on a plenum or housing 39 adjacent the inlet that is in communication with these chambers. The blower 40 takes its suction from these chambers, drawing cryogen vapor away from the inlet and can be regulated to avoid any substantial outflow of cold cryogen vapor through the entrance 14. A control for the blower 40 is coupled with a temperature sensor 42 in an exhaust duct 41 which is mounted on the front wall of the freezer. An exhaust blower (not shown) usually mounted near the roof of the building takes its suction through the duct 41 via its inlet which opens just above the freezer entrance. Thus the major portion of the atmosphere moving in the exhaust duct 41 will be the ambient air of the plant. If the temperature of the discharge stream in the exhaust duct 41 rises, the speed of blower 40 is decreased to permit slightly more cold cryogen to escape via the entrance to assure entry of ambient air into the freezer is avoided. If the temperature of the discharge stream in the exhaust duct 41 should drop substantially relative to the ambient air temperature in the plant, the speed of the blower 40 is increased so as to suck cold cryogen vapor from the entrance region and direct it horizontally into the freezer generally toward the spiral conveyor. This arrangement controls the amount of cold cryogen vapor exiting from the freezer entrance.

The entry of warm moist air into the freezer 2 as well as any outgoing convection currents are further reduced by the depending baffles 38 which effectively create several chambers. Located adjacent these chambers is the plenum chamber 39. The exhaust duct 41 is downwardly open, and the blower in the exhaust duct is sucking a major portion of ambient air and a minor portion of cryogen vapor. The blower in exhaust 41 is preferably powered by an electric motor and may be located anywhere in the duct but is preferably near the roof. By providing an opening in the wall 43 between the plenum and the entrance chambers, and an opening 44 in the opposite wall of the plenum, (see FIG. 3) vapor flow between the main portion of the cabinet, the plenum 39 and the entrance chambers can be further balanced. A slidable gate 48 partially closes the opening in the wall 43, and a similar slidable gate 50 is provided on the opposite wall to partially close that opening. The control of the blower 40 and the manual positioning of the slidable gates 48, 50 regulate the recirculation of cryogen vapor near the entrance and indirectly control of the amount of cryogen vapor which mixes with ambient air in the downwardly open exhaust duct 41.

A generally similar but smaller chamber 52 having one or more depending baffles 54 is preferably provided just interior of the exit opening 18 of the cabinet to deter currents of cryogen vapor from flowing directly out of the exit. Spill-over exhaust blowers (not shown) of a type well-known in the art are preferably associated with side ducts 56 and 57 to remove the outflowing cryogen vapor from the vicinity of the cabinet and discharge it to the atmosphere exterior of the plant.

Sets of fans or blowers 60, 62 and 64 are disposed in the interior of the cabinet: each set of four fans is located at a different one of three vertical levels, starting above the level of blower 40 and the spray nozzles on cryogen lines 26 through 32. A plurality of fans are preferably positioned so as to create three separate horizontal temperature zones, with the fans in each zone being disposed generally one above the other in the four corners of the cabinet, starting above the lowest cooling zone where the food load comes into direct contact with liquid cryogen. These groups of fans 60, 62 and 64 are generally pointed in the direction of movement of the flights of the conveyor so that the discharge from the fans is in a direction which is concurrent with the movement of the articles on the belt, i.e. the articles being carried on the belt generally moving away from the discharge of the fans. Fans 60, 62 and 64 create the horizontal circulation of cryogen vapor within the cabinet and three horizontal temperature zones of circulating vapor therein. Fans 60 circulate vapor horizontally and are in a circulation zone which is the coldest relative to the two zones above it. The circulation zone created by fans 60 is immediately above the bottom cooling zone which has the coldest temperature in the freezer, just above that of the liquid cryogen, e.g. $-196°$ C. ($-320°$ F.) for liquid nitrogen. The uppermost fans 64 create the highest temperature zone which is the warmest relative to the temperature zones below it. Fans 62 create an intermediate temperature zone between the zones created by fans 60 and 64, as seen in FIG. 3. Fan 64a is displaced from the corner of the cabinet because of the exit conveyor section and is located at about the center of the rear wall (see FIG. 2) and is adapted to direct vapor toward the corner of the cabinet which is diagonally across from the exit opening, the conveyor drive cage 22 being open and allowing circulation of vapor therethrough. Fan 64b is at a corner diagonally across from the entrance opening to the freezer and is adapted to direct vapor horizontally toward a point which is about midway along the front wall of the cabinet. Fan 64c directs vapor horizontally toward about the midpoint of the righthand wall, and fan 64d directs vapor horizontally toward the midpoint of the rear wall. Fans 60 and 62, in their respective zones, are similarly directed to create horizontal circulation in the freezer.

Control panel 66 is linked to thermocouple temperature sensing probes 67 at various points within the cabinet through out and the three horizontal zones defined by fans 60, 62 and 64, as well as near the extrance and exit. An electrical supply interface disconnect box 68 links the freezer and control panel with a power source. The control panel controls the flow of liquid nitrogen and speed of the conveyor belt such that the time the food on the conveyor is in contact with the liquid cryogen can be carefully controlled. In the usual case of food on the conveyor, the contact time of the food product with the liquid cryogen, such as liquid nitrogen, is matched to the characteristic and ability of the food to accept refrigeration.

In operation, a food product is delivered to and placed on an inlet conveyor 80 which delivers it to the straight line section 12 of the main conveyor for freezing. The food moves though entrance 14 and is sprayed with liquid cryogen in the first cooling zone, the rate of spray and speed of the conveyor being adjusted to match the ability of the food load to accept refrigeration. Optionally, the conveyor belt may be diverted downward into the pan 35 containing liquid nitrogen at the bottom of the freezer which can specifically remove heat from the undersurface of the food load. The drum 22 which is preferably of an open cage construction through which cryogen vapor can be circulated moves counterclockwise, as viewed from above (FIG. 4), causing the flights of the conveyor belt and the food load to proceed slowly up through the freezer cabinet to the level of the exit at the top of the freezer. The blower 40 pulls cryogen vapor from area of the entrance inlet directing it into the freezer where its cooling capacity can be utilized by food on the spiral conveyor. The blower in exhaust duct 41 diverts air and humidity near the entrance from the interior of the cabinet. Fans 60, 62, 64 circulate cryogen vapor horizontally within the cabinet to provide three general temperature zones, the cabinet having four zones including the first cooling zone where liquid nitrogen is contacted with the food load. Using liquid nitrogen which has a temperature of −320° F., the freezer of the invention is able to establish a temperature gradient of at least about 150° F. across the four zones of the freezer.

A temperature sensing probe 42 is in the exhaust duct 41 which is connected through control panel 66 to the speed control for the blower 40 at the entrance of the freezer such that, if the temperature being monitored goes below a preset point (or become too cold), the blower will increase its speed to suck more cold vapor from the entrance area of the freezer. Should the temperature rise above a preset point relative to the ambient air temperature in the plant (or become too warm), the speed of the blower 40 will be decreased. By this control arrangement, at least about 80% of the cryogen vapor created within the cabinet is caused to exit from the outlet 18 at the upper portion of the cabinet. In its preferred form and operation, only about 5% of the cryogen vapor created in the freezer cabinet exits through the lower entrance to the freezer, and 95% of such vapor exits at the warmer outlet 18 at the upper portion of the freezer cabinet, after it has absorbed more heat from the food being cooled or frozen.

The food load is initially exposed to liquid cryogen while it is on the straight entrance section 12 of the belt. The exposure of the food load to liquid nitrogen in the first cooling zone on the straight entrance section causes a firming of the undersurfaces of the products and substantially eliminates any damage to the food products as a result of the pinching action of the collapsing belt as it enters the main helical section. As the food load is conveyed counterclockwise upwardly along the flights of the helical conveyor 20 above the first zone, it is exposed to the freezing cryogen vapors which continue to withdraw heat from the food as desired. The apparatus and method of the invention, which includes the use of a spiral conveyor and liquid cryogen, not only controls the loss of cryogen vapors at the entrance of the freezer, but establishes a desired temperature gradient within the freezer for extremely efficient operation. The freezer of the invention can be used to freeze a wide variety of products using the variable speeds of the conveyor and blowers and varying the amount of liquid cryogen sprayed to efficiently match the ability of the food to accept refrigeration with the variable refrigeration capabilities of the freezer.

Figure 5:
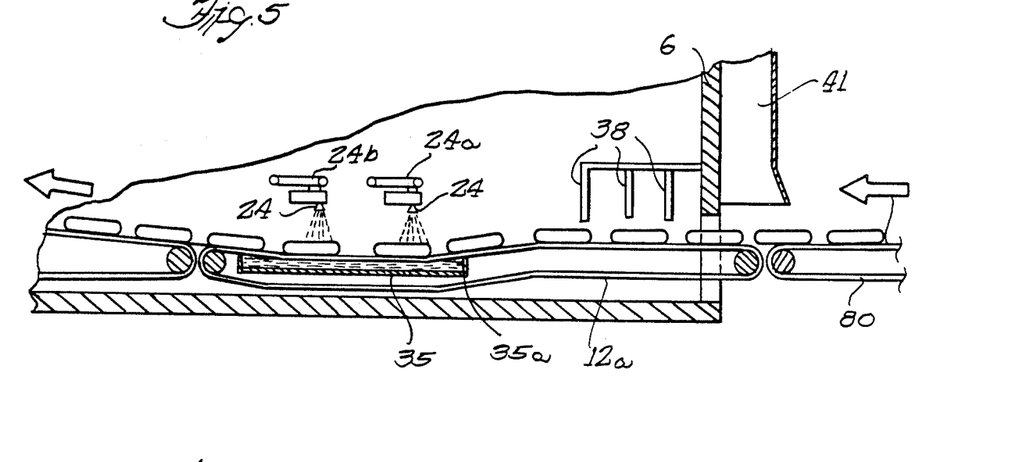
FIG. 5 is an enlarged schematic view of the entrance of the freezing apparatus.

As one example of the operation of the freezer using liquid nitrogen, hamburger patties are fed into the entrance of the freezer at a rate of about 4,000 pounds per hour and aligned six patties abreast, as shown in FIG. 6. The temperature of the entering patties is about 30° F. If considered important from the standpoint of maintaining precise alignment of the patties on the conveyor belt, the straight-line entrance section 12 of the conveyor belt could be extended further outward to a location where a hamburger-patty maker could deposit the patties directly onto the surface of the conveyor from a patty-former located over the end of such extended belt section. On the other hand, instead of extending the entrance section of the conveyor 10, as just described, it can also optionally be shortened, as depicted in FIG. 5, by disposing a separate entrance conveyor section 12a in the entrance section of the cabinet. Such an arrangement has the advantage of isolating the main conveyor, which includes the major helical section, from the entrance into the freezer where the temperature will be much closer to ambient thus preventing this belt from having to undergo substantial temperature changes over a relatively short distance. A shorter belt that operates only in a straight line configuration can be better adapted to accommodate subjection to such widely varying temperatures.

Another option, as indicated hereinbefore, is that the belt could be slightly elevated in the entrance conveyor section, and the pan 35 placed below the returning flight of the conveyor. Then a set of upwardly directed spray nozzles is located between the two flights so as to spray liquid cryogen against the undersurface of hamburger patties or the like carried on the belt; in such a case the pan 35 would serve only as a catch basin from which evaporation would thereafter take place.

By the time the hamburger patties reach the transition region between the straight-line entrance section 12 and the main helical section 20 of the conveyor, the undersurfaces of the patties have been sufficiently rigidified by freezing so as to permit the collapsing links of the conveyor belt to move relative thereto without tearing or otherwise marring the surface characteristics.

Figure 4:
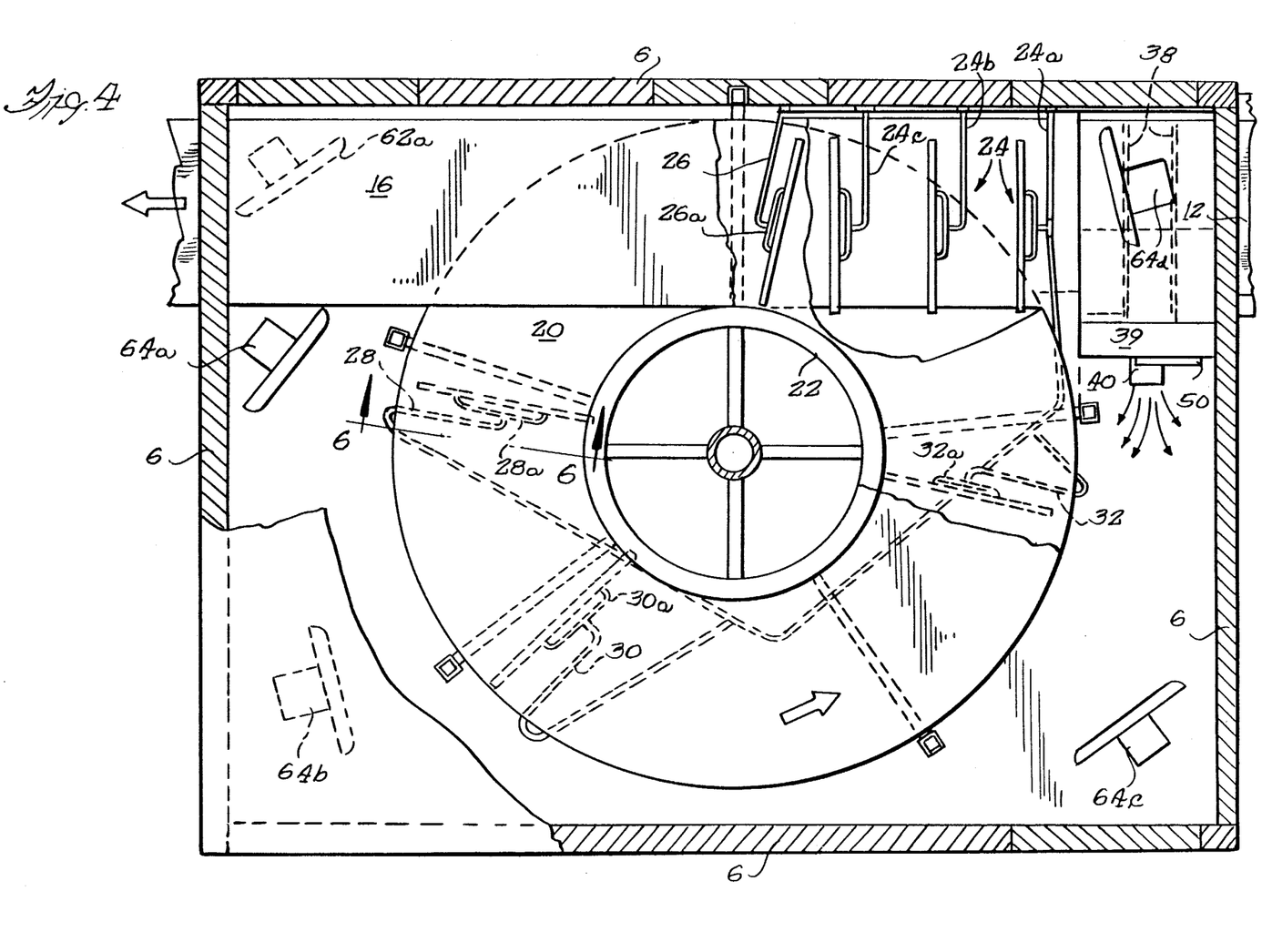
FIG. 4 is an enlarged top view of the interior of the freezing apparatus of FIG. 1 with portions broken away and portions shown in section.

While the hamburger patties are on the lowermost two flights of the helical section 20 of the conveyor, they are subjected to eight additional regions of liquid spray, as can be seen from FIGS. 3, 4 and 6. The helical section 20 is arranged so that there is substantially more head space, indicated as 36, above the lowermost two flights which provides room for the mounting of the spray nozzles 24 that are respectively connected to the headers 26a, 28a, 30a and 32a which are located at approximately 90 degree intervals around the helical path and at generally vertically aligned positions above the lowermost two conveyor belt flights. These spray nozzles 24 are preferably spring-loaded to a closed position and are actuated as a result of supplying liquid nitrogen under sufficient pressure to the lines in question from a liquid nitrogen supply unit 85 that is operated by the control panel 66. The control panel 66 monitors the temperature throughout the freezer cabinet through the use of thermocouples 67. If desired, the control system can be set so as to supply liquid cryogen under pressure separately to the three headers 24 arranged over the entrance section, as opposed to the radially disposed headers associated with the helical section 20. Such an arrangement would permit an increase or decrease of the amount of liquid cryogen being sprayed in the helical section without necessarily varying the amount of cryogen being sprayed at the entrance section.

The fans 60, 62 and 64, which are located about the periphery of the helical conveying section and create the three separate temperature zones, preferably have electrical motors and are preferably wired so that the set of fans at each of the three vertical levels can be controlled separately via the control panel 66. Such an arrangement allows fine-tuning or adjustment of the cooling performance within the freezer, which as previously mentioned is specifically designed to allow its performance to be matched very closely to the capacity of the food products to accept refrigeration. The velocity at which the cold cryogen vapor impinges against the food products has an effect upon the amount of heat that will be withdrawn, and thus this adjustment of the speed of the fans can be useful in efficiently removing heat from the food products at appropriate times and temperatures. It is also possible that certain products being frozen should not be subjected to such high velocity vapor streams, and when such products are being frozen, the control panel 66 can appropriately reduce the speed of the fans.

Assuming the hamburger patties are fed into and through the freezer at a rate of about 4,000 pounds per hour, the freezer 2 could be set so as to operate at a conveyor speed at about 44 ft. per minute for a freezer standing about 9.5 ft. high by 14 ft. deep by 9 ft. wide. The belt in question is about 28 inches in width and forms a helical section with its inner edge in frictional contact with the driven cage 22, which is about 3.5 ft. in diameter. Under these operating conditions, it takes a hamburger patty about 6 minutes to travel from its entrance 14 of the freezer until its emergence from the upper exit 18 of the freezer, during which period of time its temperature is reduced from the exemplary entering temperature of about 30° F. to a temperature of about 0° F. for a hamburger patty which is substantially completely frozen throughout.

Exemplary of such operation would be the expenditure of about 3400 pounds per hour of liquid nitrogen, which would be sprayed from the total of the nozzles 24.

The approximate temperature of the gaseous nitrogen exiting from the upper outlet from the freezer along with the frozen patties should be at least about 150° F. higher than the temperature of the vapor adjacent the entrance, and measurement of the exit temperature preferably shows it to be about −150° F. or higher. Freezing this amount of hamburger meat by the expenditure of only about 3400 pounds per hour of liquid nitrogen at about 30 psig and about −320° F. is considered to be an extremely efficient operation which results from the ability to subject the food products to four different cooling zones of different temperature, the control of which allows the matching of the refrigeration being offered to the ability of the food products to accept such refrigeration.

Measurements taken adjacent to the entrance 14 and the exit 18 from the freezer allow it to be estimated that approximately 85 percent of the cryogen vapor created within the cabinet is exiting from the upper outlet. As earlier indicated, this regulation is achieved by the use of one or more blowers 40 which remove cold cryogen vapor from the entrance region of the freezer and redirect it into the cabinet, thus lowering the propensity of the cold cryogen vapor to flow out through the entrance 14 where its cooling capacity is lost; however, it is felt that at least about 5 percent of the cryogen vapor should be permitted to flow out through the freezer entrance so as to constitute a continual barrier to the entry of humidity-bearing ambient air. It is believed that this excellent use of the cooling capacity of such a large percentage of the cryogen vapor contributes significantly to the efficiency which is achieved during operation.

Although the invention has been described with regard to certain preferred embodiments, it should be understood that various changes and modifications as would be obvious to one having the ordinary skill in this art may be made without departing from the scope of the invention which is defined in the appended claims. Particular features of the invention are emphasized in the claims which follow.

What is claimed is:

1. A cryogenic freezer for freezing food products or the like, which freezer comprises
   an insulated enclosure having a lower inlet and an upper outlet,
   conveyer means for moving food products along a path from said inlet to said outlet, a major portion of said path being a helical section having a plurality of superimposed flights,
   means for contacting food products being moved along said path with liquid cryogen at a lower region generally near said inlet to initially withdraw a substantial amount of heat from the surface of said food products,
   means for causing generally horizontal circulation of cryogen vapor throughout upper regions of said helical section whereby a vertical temperature gradient is created within said enclosure with relatively warm temperatures existing near said outlet, and
   means for controlling vapor exit from said inlet and said outlet so that at least about 80% of the cryogen vapor created within said enclosure exits therefrom via said upper outlet.

2. A cryogenic freezer in accordance with claim 1 wherein the spacing between said plurality of superimposed flights in said helical conveyer section varies, with the lower flights being spaced further apart, and wherein said liquid contact means includes spray means for injecting a cryogenic liquid disposed between such further-spaced-apart flights for directing liquid cryogen downward onto food products carried on said conveyer means.

3. A cryogenic freezer in accordance with claim 1 designed to contact food products with liquid nitrogen wherein said vapor control means and said vapor horizontal circulation means are designed to maintain a temperature gradient of at least about 150° F. between the vapor adjacent the bottom of said enclosure and the vapor adjacent the top of said enclosure.

4. A cryogenic freezer in accordance with claim 1 wherein a variable speed blower is provided for controlling the removal of cryogen vapor from the region just interior of said inlet, wherein exhaust means is provided for exhausting a mixture of ambient air and a minor amount of cryogen vapor from a region just exterior of said inlet, wherein temperature-sensing means is provided for measuring the temperature of said mixture being exhausted and wherein means is provided for changing the speed of said blower pursuant to the temperature measured.

5. A cryogenic freezer in accordance with claim 1 wherein said conveyer means includes a porous belt and wherein said liquid contacting means, at a region generally adjacent said inlet and within the confines of the freezer, includes pan means for holding cryogenic liquid and overhead spray means overlying said pan means which is designed to spray liquid cryogen onto food products carried by said porous conveyer belt with excess liquid cryogen passing through said porous belt and being received in said pan means, the conveyor means being adapted to move food products through said pan means so as to contact said conveyor means and at least the bottom surface of food products thereon with liquid cryogen in said pan means.

6. A cryogenic freezer in accordance with claim 5 wherein means is provided for detecting the level of cryogenic liquid within said pan means and for adjusting the flow of cryogenic liquid through said overhead spray means relative to the level detected.

7. A cryogenic freezer in accordance with claim 1 wherein said conveyor means includes a straight entrance section adjacent the lower inlet, wherein said liquid contacting means includes spray nozzles for spraying liquid cryogen downwardly onto food products on said conveyor means at the straight entrance section thereof, and wherein said vapor horizontal circulation means includes at least one fan disposed above the spray nozzles, the fan being disposed to direct its discharge generally horizontally toward the helical section of the conveyor means.

8. A cryogenic freezer in accordance with claim 7 wherein a variable speed blower is provided for controlling the exit of cryogen vapor from a region of said enclosure interior of said inlet, wherein means is provided for exhausting a mixture of ambient air and cryogen vapor from a region exterior of said inlet, wherein temperature-sensing means is provided for measuring the temperature of said mixture being exhausted and wherein means is provided for changing the speed of said blower relative to the temperature measured.

9. A cryogenic freezer in accordance with claim 8 wherein said vapor control means and said vapor horizontal circulation means are designed to maintain a temperature gradient of at least about 150° F. between the cryogen vapor adjacent said inlet of said enclosure and the cryogen vapor adjacent said outlet of said enclosure.

10. A cryogenic freezer in accordance with claim 9 wherein said conveyer means includes a porous belt and wherein said liquid contacting means, at a region generally adjacent said inlet and within the confines of the freezer, includes pan means for holding cryogenic liquid and overhead spray means overlying said pan means which is designed to spray liquid cryogen onto food products carried by said porous conveyer belt, with excess liquid cryogen passing through said porous belt and being received in said pan means, said conveyor means being adapted to move food products through the pan means to contact said conveyor means and at least the bottom surface of food products thereon with liquid cryogen in said pan means.

11. A method for freezing food products, the method comprising:
conveying the food into a freezer refrigerated by liquid cryogen on a variable speed conveyor, the freezer including an inlet in a lower location and an outlet in an upper location;
spraying the food on the conveyor with liquid cryogen as it is being moved in a lower portion of the the freezer following passage through the inlet;
horizontally circulating cryogen vapor in the freezer, said horizontal circulation of cryogen vapors establishing a vertical temperature gradient within the freezer at least about 150° F.
conveying the food upwardly through said temperature gradient of cryogen vapors in the freezer;
correlating the refrigeration within the freezer with the thermal acceptance of the food; and
controlling the exit of liquid cryogen vapor from the inlet of the freezer so that at least about 80% of the cryogen vapor created within the enclosure exits therefrom by the upper outlet.

12. A method as recited in claim 11 wherein the liquid cryogen is liquid nitrogen, wherein the conveyor has a helical conformation within the freezer with the food being conveyed upwardly along such helical conformation, and wherein the correlation of refrigeration includes varying the speed of the conveyor and food load thereon through the temperature gradient.

13. A method as recited in claim 12 wherein the method further includes moving the conveyor belt and the food thereon through a reservoir of liquid nitrogen interior of the freezer at a location near the inlet.

* * * * *

UNITED STATES PATENT AND TRADEMARK OFFICE
CERTIFICATE OF CORRECTION

PATENT NO.   :   4,739,623
DATED        :   April 26, 1988
INVENTOR(S)  :   Lewis Tyree, Jr., et al.

It is certified that error appears in the above-identified patent and that said Letters Patent is hereby corrected as shown below:

Column 4, line 19, Delete "all" and insert --throughout--.

Column 7, line 37, Change "become" to --becomes--.

Column 9, line 10, Change "create" to --discharge generally horizontally into the open helical conveyor creating--.

Column 12, line 29, After "freezer" insert --of--.

Signed and Sealed this

Fourth Day of October, 1988

Attest:

DONALD J. QUIGG

Attesting Officer

Commissioner of Patents and Trademarks